United States Patent [19]
Lee et al.

[11] Patent Number: 5,674,796
[45] Date of Patent: Oct. 7, 1997

[54] PROCESSES OF REGENERATING NI CATALYSTS AND OF PREPARING NI CATALYSTS

[75] Inventors: Ho-in Lee, Seoul; Sang-heup Moon, Seocho-Ku; Gyo-hyun Hwang, Kyungnam; Byung-youl Coh, Seoul; Seung-hyun Hur, Kyungnam; Sung-hee Han, Seoul; Heung-sun Park, Seoul; Jong-hae Lee, Seoul, all of Rep. of Korea

[73] Assignees: Lucky Engineering Co., Ltd.; Seoul National University, both of Seoul, Rep. of Korea

[21] Appl. No.: 362,845

[22] Filed: Dec. 22, 1994

[30] Foreign Application Priority Data

Jul. 20, 1994 [KR] Rep. of Korea ............... 94-17482

[51] Int. Cl.$^6$ .............. B01J 20/34; B01J 38/60; B01J 38/02; B01J 38/10
[52] U.S. Cl. .............. 502/22; 502/27; 502/29; 502/25; 502/38; 502/53; 502/56; 502/335; 502/325; 502/332
[58] Field of Search .............. 502/335, 325, 502/332, 29, 27, 38, 25, 53, 56, 22

[56] References Cited

U.S. PATENT DOCUMENTS

| | | | |
|---|---|---|---|
| 1,390,684 | 9/1921 | Ellis. | |
| 3,635,841 | 1/1972 | Keith et al. | 252/466 PT |
| 3,674,707 | 7/1972 | Pieters et al. | 252/413 |
| 3,676,364 | 7/1972 | Coates | 252/413 |
| 3,993,554 | 11/1976 | Suggitt et al. | 204/162 X |
| 4,002,692 | 1/1977 | Mabuchi et al. | 260/617 R |
| 4,025,561 | 5/1977 | Suggitt et al. | 260/583 K |
| 4,042,490 | 8/1977 | Suggitt et al. | 208/264 |
| 4,361,495 | 11/1982 | Hort et al. | 252/411 R |
| 4,465,788 | 8/1984 | Miller | 502/217 |
| 4,539,310 | 9/1985 | Leftin et al. | 502/303 |
| 4,584,139 | 4/1986 | Gray et al. | 260/409 |
| 4,650,782 | 3/1987 | Onal | 502/339 |
| 5,045,520 | 9/1991 | Curry-Hyde et al. | 502/301 |
| 5,234,883 | 8/1993 | Schaefer-Sindlinger et al. | 502/339 |
| 5,356,845 | 10/1994 | Clavena et al. | 502/21 |

FOREIGN PATENT DOCUMENTS

| | | |
|---|---|---|
| 99549 | 9/1932 | Japan. |
| 180496 | 5/1949 | Japan. |
| 33510 | 3/1990 | Rep. of Korea. |

*Primary Examiner*—Glenn A. Caldarola
*Assistant Examiner*—Thuan D. Dang
*Attorney, Agent, or Firm*—Woodcock Washburn Kurtz Mackiewicz & Norris LLP

[57] ABSTRACT

The present invention relates to processes of regenerating Ni catalysts which had been used in a hydrogenation of unsaturated fatty oil or petroleum resin, which comprise separating the Ni-extracted solution and support by extracting the pretreated Ni catalysts with an acid, preparing support-containing solution by burning the separated support in the flow of air or oxygen diluted with nitrogen at the temperature of 300° to 800° C. for 5 to 15 hours and adding deionized water to the support, preparing a catalyst precursor by dropping the Ni-extracted solution and the mixed solution of a basic compound and a compound with free oxygen in the support-containing solution during agitation so as to keep PH of the solution at 9 to 13, whereby nickel oxide precipitates on the support, carrying out a step consisting of aging, washing, filtering and drying the catalyst precursor, and stabilizing the dried catalyst precursor by reducing with hydrogen and passing in nitrogen diluted with oxygen or an organic material.

22 Claims, 2 Drawing Sheets

PROCESSES OF REGENERATING NI CATALYSTS AND OF PREPARING NI CATALYSTS

FIELD OF THE INVENTION

The present invention relates to a process of generating Ni catalysts which had been used in the hydrogenation of unsaturated fatty oil to provide the oil with chemical stability and a high melting point.

The invention also relates to a process of generating Ni catalysts which had been used in a hydrogenation of petroleum resin.

The invention includes a process of preparing Ni catalysts which are used in the hydrogenation of unsaturated fatty oil or petroleum resin.

BACKGROUND OF THE INVENTION

Ni catalysts with more than 20% Ni content are used in the preparation of hardened fatty oil having chemical stability and a high melting point through hydrogenation of unsaturated fatty oil such as cream, bean oil or fish oil. During the process, the Ni catalysts easily lose catalytic activity by coking or poison of impurities such as sulfur or phosphor in the reaction materials. Thus, in the preparation of hardened fatty oil, a large amount of used Ni catalysts is produced, and much research on regeneration of the used Ni catalysts has been intensively carried out.

U.S. Pat. No. 1,390,684 discloses a process of regenerating catalytic nickel material which comprises freeing the catalytic material to a large extent from fatty or oily material, dissolving the residue in nitric acid, precipitating the nickel from the nickel solution as a basic compound, in reacting upon the basic material in the freshly precipitated condition with formic acid, and decomposing such salt by heating to a temperature at or above the decomposition point.

Japanese Patent No. 99,549 discloses a process of recycling nickel content by extracting nickel content from used nickel catalysts. Furthermore, Japanese Patent No. 180,496 discloses a process of regenerating Ni catalysts which had been used in a process of preparing hardened fatty oil. The process of regenerating Ni catalysts in Japanese Patent No. 180,496 comprises adding new nickel to used Ni catalysts, precipitating the new nickel on the support of the use Ni catalysts, thereby regenerating Ni catalysts. The cost for regeneration by the process is lower than that for preparation of new nickel catalysts. However, it is impossible to successively regenerate used Ni catalysts, because the regenerated Ni catalysts cannot maintain proper catalyst activity due to increase of nickel content on the support.

South Korean Patent No. 33,510 discloses a process of regenerating Ni catalysts which had been used in the manufacture of hardened fatty oil, which is different from the processes of the above mentioned Japanese and U.S. Patents. In the South Korean Patent, the process comprises precipitating Ni composition such as nickel hydroxide and nickel carbonate on the support and forming nickel oxide on the support by calcination.

The present invention provides methods of regenerating Ni catalysts with high activity and homogeneity by directly precipitating nickel oxide to the support.

There are various conventional processes of preparing new Ni catalysts such as ion exchange, impregnation and precipitation. Generally ion exchange and impregnation are used for the preparation of Ni catalysts with lower nickel content, and precipitation is used for the preparation of Ni catalysts with higher nickel content. The precipitating amount of nickel in nickel catalyst ranges from 20 to 80 weight %. Accordingly, a precipitation process is conventionally used in preparing new Ni catalysts or regenerating used Ni catalysts.

The precipitation process of preparing new Ni catalysts is carried out by precipitating hydroxide or carbonate to the support in a solution of nickel, precipitant and coprecipitants such as urea, carrying out steps consisting of aging, washing, filtering and drying the resultant product, calcinating the product into a metal oxide compound, hydrogenating the calcinated product, and stabilizing the Ni catalysts with oxygen diluted with nitrogen or an organic material.

OBJECTS OF THE INVENTION

An object of the present invention is to provide a process of regenerating Ni catalysts which had been used in the hydrogenation process of unsaturated fatty oil.

Another object of this invention is to provide a process of regenerating Ni catalysts which had been used in the hydrogenation of petroleum resin.

A further object of this invention is to provide homogeneous Ni catalysts having a high catalyst activity by regenerating Ni catalysts which had been used in the hydrogenation process of unsaturated fatty oil or petroleum resin.

A further object of this invention is to provide a process of preparing new Ni catalysts which are used in a hydrogenation process of unsaturated fatty oil or petroleum resin, by using a mixed solution of a basic compound and a compound with free oxygen, thereby obviating a washing step or a calcinating step.

SUMMARY OF THE INVENTION

The process of regenerating Ni catalysts which had been used in the hydrogenation of unsaturated fatty oil comprises pretreating used Ni catalysts by extracting the used Ni catalysts with a solvent and burning the Ni-extracted catalysts in a furnace so as to remove impurities therein, separating the Ni-extracted solution and support by extracting the pretreated Ni catalysts with an acid, preparing support-containing solution by burning the separated support in the flow of air or oxygen diluted with nitrogen at a temperature of 300° to 800° C. for 5 to 15 hours and adding deionized water to the support. A catalyst precursor is prepared by dropping the Ni-extracted solution and the mixed solution of a basic compound and a compound with free oxygen in the support-containing solution during agitation so as to keep pH of the solution at 9 to 13, whereby nickel oxide precipitates on the support, carrying out steps of aging, washing, filtering and drying the catalyst precursor, and stabilizing the dried catalyst precursor by reducing with hydrogen and passing the catalyst precursor in nitrogen diluted with oxygen or an organic material.

In another process of regenerating Ni catalysts which had been used in the hydrogenation of unsaturated fatty oil, the catalyst precursor is prepared by dropping the mixed solution of a basic compound and a compound with free oxygen in the mixed solution of the support-containing solution and Ni-extracted solution during agitation, whereby nickel oxide precipitates on the support.

The process of regenerating Ni catalysts which had been used in the hydrogenation of unsaturated fatty oil or petroleum resin obviates a step of pretreating used Ni catalysts which comprises extracting the used Ni catalysts with a solvent and burning the extracted Ni catalysts in a furnace so as to remove the impurities therein.

The process of preparing new Ni catalysts which are used in the hydrogenation process of unsaturated fatty oil or petroleum resin comprises preparing a catalyst precursor by dropping Ni solution in a support-containing solution during agitation at the temperature of 50° to 90° C. and by dropping the mixed solution of a basic compound and a compound with free oxygen so as to keep pH of the solution at 9 to 13, carrying out steps of aging, washing, filtering and drying the catalyst precursors, and stabilizing the dried catalyst precursor by reducing with hydrogen and passing the catalyst precursors in oxygen diluted with nitrogen or an organic material. The present process also obviates a calcinating step of the catalyst precursor.

In another process of preparing Ni catalysts which are used in the hydrogenation process of unsaturated fatty oil or petroleum resin, the catalyst precursor is prepared by dropping the mixed solution of a basic compound and a compound with free oxygen in the mixed solution of a support-containing solution and a Ni solution during agitation.

DETAILED DESCRIPTION OF THE INVENTION

Figure 1:
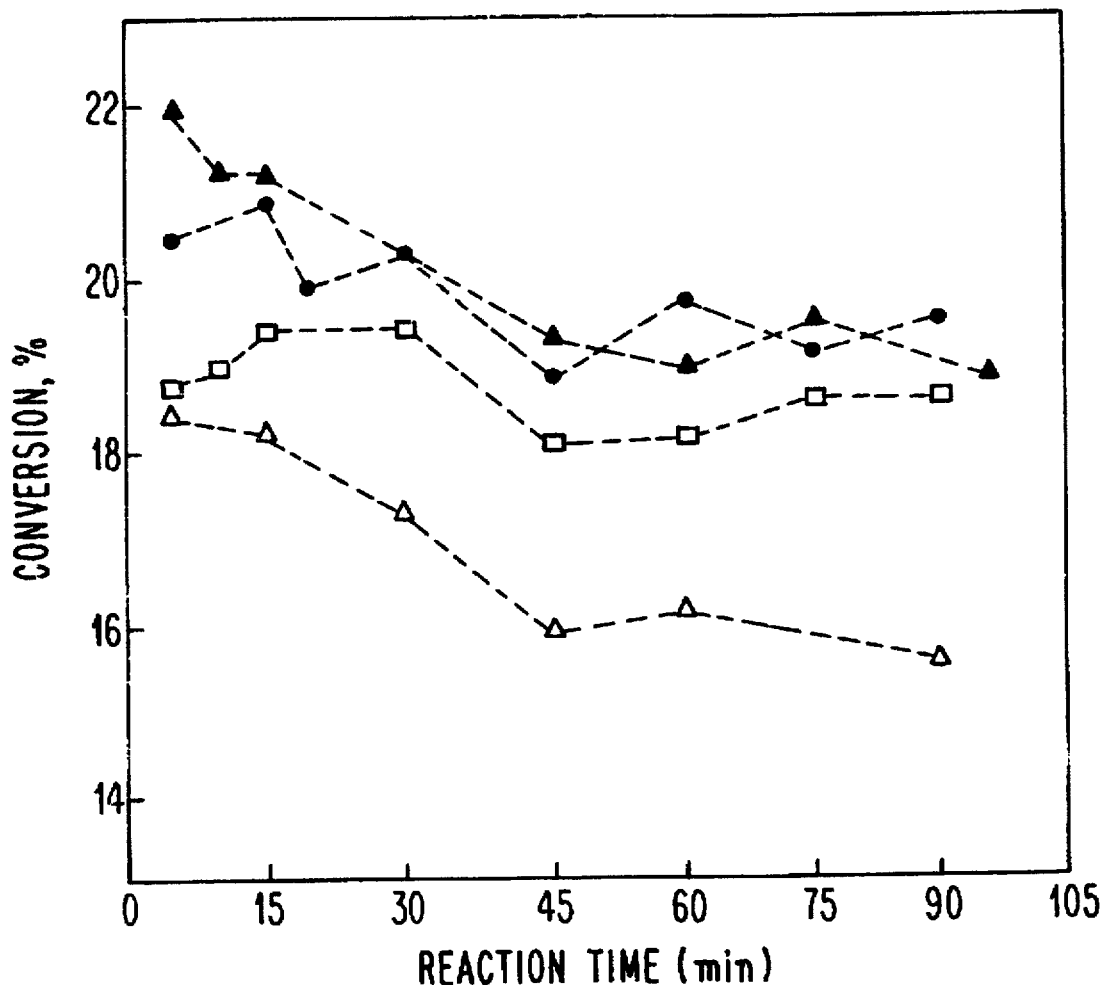
FIG. 1 shows activity of a new Ni catalyst and regenerated Ni catalysts prepared from used Ni catalysts of hydrogenation of unsaturated fatty oil according to the present invention.

In a process for preparing hardened fatty oil such as margarine and soap having chemical stability and a high melting point by hydrogenating unsaturated fatty oil such as cream, bean oil and fish oil or of hydrogenating petroleum resin, Ni catalysts with more than 20% Ni content and a support of kieselguhr are used. However, during the process, the Ni catalysts easily lose catalytic activity by coking or poisoning of impurities such as sulfur or phosphorus in the reacting materials. Thus, in the process of preparing hardened fatty oil or hydrogenating petroleum oil, large amounts of used Ni catalysts are produced, and most of the used Ni catalysts is recycled.

According to the present invention, the process of regenerating Ni catalysts which had been used for hydrogenation of unsaturated fatty oil comprises pretreating used Ni catalysts by extracting the used Ni catalysts with a solvent and burning the extracted Ni catalysts in a furnace so as to remove impurities therein, separating the Ni-extracted solution and support by extracting the pretreated Ni catalysts with an acid, preparing support-containing solution by burning the separated support in the flow of air or oxygen diluted with nitrogen at a temperature of 300° to 800° C. for 5 to 15 hours and adding deionized water to the support, preparing a catalyst precursor by dropping the Ni-extracted solution and a mixed solution of a basic compound and a compound with free oxygen in the support-containing solution during agitation so as to keep the pH of the solution at 9 to 13, whereby nickel oxide precipitates on the support, carrying out steps of aging, washing, filtering and drying the catalyst precursor, and stabilizing the dried catalyst precursor by reducing the catalyst with hydrogen and passing the catalyst in oxygen diluted with nitrogen or an organic material.

In the pretreating step of used Ni catalysts which had been produced during the manufacture of hardened fatty oil through hydrogenation of unsaturated fatty oil, the pretreating step comprises extracting the used Ni catalysts with an organic solvent for about 10 hours in order to remove tallow, fat and other impurities, drying the extracted Ni catalysts in a dryer to remove the organic solvent, and burning the dried Ni catalysts in a furnace at a temperature of 400° to 800° C. for 3 to 10 hours so as to burn impurities such as hydrocarbons and other organic substances. Organic solvents which may be used in the pretreating step include, but are not limited to, diethylether, acetone and tetrahydrofuran. The impurities are completely removed by performing the pretreating step. In a process of regenerating Ni catalysts which had been used to hydrogenate petroleum resin, the pretreating step may be omitted.

The step of separating the nickel and support is carried out by adding an acid to the pretreated Ni catalysts. In the separating step, nitric acid, sulfuric acid or hydrochloric acid may be used, and nitric acid is preferably used. Thus, by adding an acid to the pretreated Ni catalysts, the Ni component is dissolved from the Ni catalysts thereby separating nickel and support. The acid is added in a ratio of 1 to 4 times the amount of nickel in the pretreated Ni catalysts. Preheated Ni catalyst is added to the acid and maintained at a temperature of 50° to 90° C. for about 5 to 15 hours. Thereafter, the solution is filtered to separate the Ni-extracted solution and support.

The separated support is burned in air or in the flow of oxygen diluted with nitrogen at a temperature of 300° to 800° C. for about 5 to 15 hours. A support-containing solution is prepared by adding deionized water to the support. In methods of the present invention 120 to 250 ml deionized water per gram of the support is added. The resulting support-containing solution is a suspension.

A catalyst precursor is prepared by dropping the Ni-extracted solution and the mixed solution of a basic compound and a compound with free oxygen in the support-containing solution during agitation at a temperature of 50° to 90° C. In accordance with the present invention, a compound with free oxygen means a free oxygen-releasing compound. The compound with free oxygen is added as a precipitant of the nickel oxide. The catalyst precursor is a support on which nickel oxide precipitated. Examples of compounds with free oxygen are $NaOCl$, $H_2O_2$, $HOCl$ and $Ca(OCl)_2$. Examples of basic compounds are $NaOH$, $NH_4OH$, $(NH_4)_2CO$, $Na_2CO_3$ and $NaHCO_3$. The compound with free oxygen acts as precipitant and the basic compound acts as a pH controlling agent. A solution of about 10 to 15 weight % of a free oxygen may be preferable. For example, where $NaOCl$ is the compound with free oxygen and $NaOH$ is the basic compound, the mixed solution is prepared by adding 10 g of $NaOH$ and 150 ml of deionized water to 100 ml of 10 to 5, weight % of a $NaOCl$ solution. When $Ca(OCl)_2$ is used instead of $NaOCl$, the amount of $Ca(OCl)_2$ to be used can be reduced to half of the amount of $NaOCl$ because $Ca(OCl)_2$ has twice as much free oxygen as $NaOCl$. Where $H_2O_2$ or $HOCl$ are used as the compound with free oxygen and $NH_4OH$ as the basic compound, the washing step which may be carried out after aging is omitted, because alkali ions such as sodium ions and carbonate ions are not contained in the catalyst precursor.

The Ni-extracted solution and the mixed solution of a basic compound and a compound with free oxygen are dropped in the support-containing solution during agitation over 1 to 10 hours. The mixed solution with a basic compound is added to keep pH of the total solution at 9 to 13. The pH of the total solution is maintained at 9 to 13 because oxidation ability of the lower than decreases at pH lower than 9. Poor oxidation at the lower pH, causes nickel ions to remain in solution and precipitation of nickel oxide on the support cannot be obtained.

In another process of regenerating Ni catalysts which had been used in a hydrogenation of unsaturated fatty oil, the catalyst precursor is prepared by dropping the mixed solution of a basic compound and a compound with free oxygen in the mixed solution of the support-containing solution and Ni-extracted solution during agitation, whereby nickel oxide precipitates on the support. In the process, preparation of the catalyst precursor is not affected by pH of the solution, but affected by the mixed solution of the basic compound and compound with free oxygen. In a process of preparing catalyst precursor, the process which controls the amount of the mixed solution of the basic compound and compound with free oxygen is more simple than the process which controls the pH of the total solution. Of course, particles of the catalyst precursor tend to become larger in the former process than in the latter process, because it is much easier for nickel particles to contact with NaOCl in the former process. However, there is no difference in catalystic activity of the regenerated catalysts prepared according to the two processes.

Steps of aging, washing, filtering and drying the catalyst precursor are carried out in conventional ways. The solution containing the catalyst precursor is stirred and aged for no more than 16 hours, washed 2 to 5 times with boiling deionized water, filtered and dried at a temperature Of 50° to 200° C. Steps of aging, washing, filtering and drying the catalyst precursor are easily carried out by a skilled person in this technical field. However, where either $H_2O_2$ or HOCl is chosen as the compound with free oxygen and $NH_4OH$ as basic compound, the washing may be omitted, because alkali ions such as sodium ions and carbonate ions are not precipitated on the catalyst precursor.

The catalyst precursor is stabilized by reducing with hydrogen and passing the catalyst in oxygen diluted with nitrogen or an organic material. In this invention, the catalyst precursor is not calcinated. Thus the calcinating step is omitted. In the prior conventional processes to prepare new Ni catalysts or to regenerate used Ni catalysts, a step of calcinating the catalyst precursor is carried out so as to change the nickel hydroxide($Ni(OH)_2$) or nickel carbonate ($Ni(CO_3)_2$) on the catalyst precursor into nickel oxide(NiO). In the conventional processes, since either NaOH or $Na_2CO_3$ is used as precipitant, either nickel hydroxide(Ni(OH)$_2$) or nickel carbonate (Ni(CO)$_3$)$_2$ precipitates on the catalyst precursor. The nickel hydroxide or nickel carbonate is converted into nickel oxide through the calcinating step. However, in the step of preparing the catalyst precursor according to the present invention, nickel hydroxide or nickel carbonate does not precipitate on the support. Instead nickel oxide precipitates on the support. Therefore the calcinating step of the catalyst precursor is not required in the present invention. The stabilizing step of the catalyst precursor is carried out according to conventional processes, which are easily carried out by a person skilled in the art.

In the stabilizing step, the catalyst precursor is reduced with hydrogen. The hydroxyl group on the catalyst precursor is removed through hydrogenation with hydrogen at a temperature of 180° to 220° C. After the hydroxyl group is removed, nickel oxide on the support reduces to nickel at a temperature of 350° to 700° C. The reduction of nickel oxide is preferably performed at about 380° C. In conventional processes, the range of temperature to remove hydroxyl groups on the support is almost same as the range of temperature used to reduce nickel oxides. However, in the present processes, the range of temperature necessary to remove hydroxyl groups on the support is different from the range of temperature to reduce nickel oxides. Accordingly, in the present invention, the hydroxyl groups on the support are removed by producing $H_2O$ through hydrogenation at a temperature of 180° to 220° C., and the nickel oxides on the support are reduced to nickel at a temperature of 350° to 700° C.

The process of preparing the catalyst precursor may be applied to a process of preparing new Ni catalysts. The catalyst precursor is prepared by dropping Ni solution in a support-containing solution during agitation at a temperature of 50° to 90° C. and by dropping the mixed solution of a basic compound and a compound with free oxygen in the solution so as to keep pH of the total solution at 9 to 13. Steps of aging, washing filtering and drying the catalyst precursor are carried out in conventional ways. A calcinating step for the catalyst precursor is not required in this process. Thereafter, the catalyst precursor is stabilized by reducing with hydrogen and passing the catalyst precursor in oxygen diluted with nitrogen or an organic material.

In another process of preparing Ni catalysts which are used in the hydrogenation of unsaturated fatty oil or petroleum resin, the catalyst precursor is prepared by dropping the mixed solution of a basic compound and a compound with free oxygen in the mixed solution of a support-containing solution and a Ni solution during agitation. The catalyst precursor is aged, washed, filtered and dried in conventional ways. However, where $H_2O_2$ or HOCl are used as basic compounds, the washing of the catalyst precursor may be omitted because alkali ions such as sodium ions and carbonate ions are not precipitated on the catalyst precursor. In this process, the catalyst precursor is not calcinated. Examples of support include, but are not limited to, natural kieselguhr, silica, synthetic silica-alumina and alumina.

The present invention has the following effects. Compounds with free oxygen which are used in this invention are normally cheaper than prior conventional precipitant. Also, as the calcinating step is omitted, the invention can reduce energy costs and be carried out with ease.

The invention may be better understood by reference to the following examples which are intended for the purpose of illustration and are not to be construed as in any way limiting the scope of the present invention, which is defined in the claims appended hereto.

EXAMPLES

Example 1

The hardened oil was prepared by nickel catalysts (NYSOSEL 222[Trademark]), manufactured by Engelhard Company(Cleveland, Ohio, U.S.A.) The used Ni catalysts were pretreated by using Soxlet equipment. In the Soxlet equipment, 5 g of used Ni catalysts was extracted with 100 ml of diethyether. The extracted Ni catalysts were burned in an electric furnace at 500° C. for 5 hours so as to remove impurities on the catalysts. 3 g of pretreated Ni catalysts was added to 200 ml of 6.2 weight % nitric acid, and the suspension was heated to 80° C. Nickel was extracted from the suspension for 10 hours. The support and Ni solution were separated. The support was calcinated at 600° C. 500 ml of Ni solution was put into a first burette 250 ml of 6.2 weight % NaOCl and 10 g of NaOH were put into a second burette, and 150 ml of deionized water and 0.97 g of Support were put in 3-neck RB flask. The flask was heated to 80° C. and the solutions of the first and second burettes were dropped in the flask over 3 hours, keeping pH of the total solution at 11. The precipitated solution was aged for 10 hours, washed with boiling deionized water, filtered 10 times, and dried in an oven at 100° C. for 3 hours. The dried catalyst was pulverized to powder below 200 mesh.

In the flow of hydrogen at 15 cc/min and nitrogen at 20 cc/min, 2 g of the pulverized powder in a reactor was heated to 200° C. over 1 hour, maintained at 200° C. for 2 hours, heated to 400° C. over 1 hour, and maintained at 400° C. for 12 hours. The Ni catalyst was stabilized in the flow of nitrogen at 20 cc/min and oxygen at 1 cc/min.

Example 2

Example 2 was carried out under the same conditions as in Example 1 except that 2 g of the pulverized powder in a reactor was heated to 200° C. over 1 hour, maintained at 200° C. for 2 hours, heated to 400° C. over 2 hours, and maintained at 400° C. for 12 hours, in the flow of hydrogen at 15 cc/min and nitrogen at 20 cc/min.

Example 3

Example 3 was carried out under the same conditions as in Example 1 except that 250 g of 6.2 weight % NaOCl and 10 g of NaOH were put into a second burette, and 500 ml of Ni solution, 150 ml of deionized water and 0.97 g of support were put in 3-neck RB flask, that the solution of the second burette was dropped in the flask over 3 hours, and that the Ni catalyst was stabilized in the flow of cyclohexane at 20 cc/min.

Example 4

The SAKAI Ni catalysts (manufactured by SAKAI Co., Japan) was used in the hydrogenation of petroleum resin. 5 g of the used Ni catalysts was put into 500 ml of water. 10 ml of nitric acid was added to the Ni solution. The solution was heated to 80° C. and maintained at the temperature of 80° C. for 5 hours to separate the support and Ni solution. The separated support was burned in an electric furnace for 12 hours to remove other hydrocarbons. The remaining Processes were carried out as in Example 1.

Comparative Example 1

5 ml of nitric acid and 2 g of used Ni catalyst produced from hydrogenation of petroleum resin were added to 500 ml of water. The solution was stirred, heated to 80° C., and filtered to separate the support and Ni solution. The separated support was calcinated at the temperature of 700° C. for 12 hours. 3 g of $Ni(NO_3)_2 \cdot 6H_2O$ was added to the Ni solution. The calcinated support was put into deionized water to prepare a support-containing solution. The support-containing solution was mixed with the Ni solution. Then 2.2 g of urea was added to the mixed solution. The mixed solution was heated to 80° C., and 1 N $Na_2CO_3$ was dropped to the mixed solution over 3 to 5 hours, keeping pH of the solution at 9. 5. The resultant solution was aged, washed and filtered. The filtered catalyst is dried in an oven at the temperature of 120° C. for 12 hours. The catalyst was calcinated in an electric furnace at the temperature 500° C. for 12 hours so as to change nickel carbonate on the support to nickel oxide. The catalyst was reduced with hydrogen to change nickel oxide to nickel. The catalyst was stabilized at the atmosphere of nitrogen.

Catalyst Activity

Figure 2:
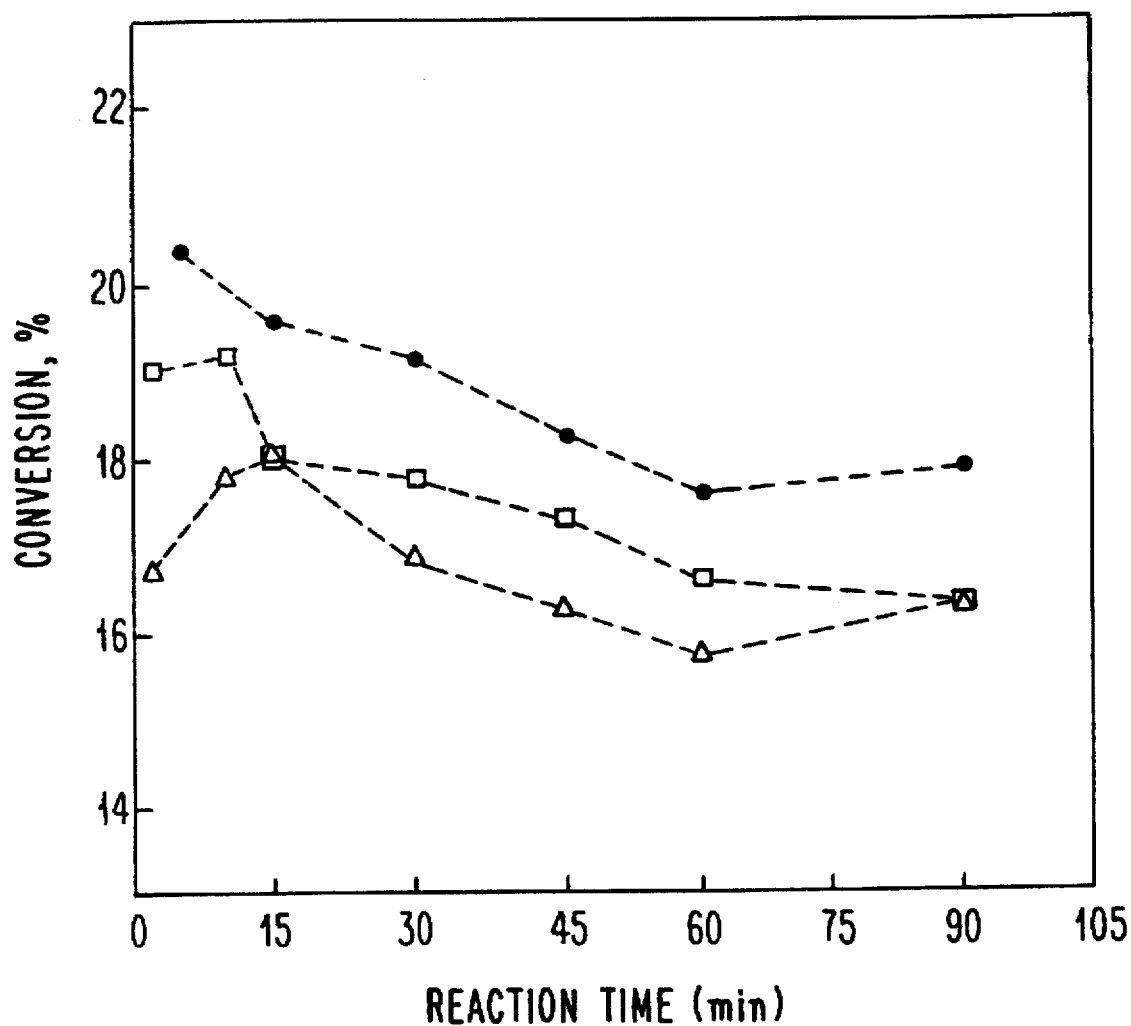
FIG. 2 shows activity of a new Ni catalyst and regenerated Ni catalysts prepared from used Ni catalysts of hydrogenation of petroleum resin according to the present invention.

FIG. 1 shows activities of a new Ni catalyst and Ni catalysts which were regenerated according to Examples 1–3. FIG. 2 shows activates of a new Ni catalyst and Ni catalysts which were regenerated according to Example 4 and Comparative Example 1. The activities of the regenerated Ni catalysts according to the present invention are superior to those of new Ni catalysts.

What is claimed is:

1. A process of regenerating Ni catalysts which had been used in hydrogenation of unsaturated fatty oil, which comprises:

pretreating used Ni catalysts by extracting the used Ni catalysts with a solvent and burning the extracted Ni catalysts in a furnace so as to remove impurities therein;

separating the Ni-extracted solution and support by extracting the pretreated Ni catalyst with an acid;

preparing support-containing solution by burning the separated support in the flow of air or oxygen diluted with nitrogen at a temperature of 300° to 800° C. for 5 to 15 hours and adding deionized water to the support;

preparing a catalyst precursor by dropping the Ni-extracted solution and a mixed solution of a basic compound and a compound with free oxygen into the support-containing solution during agitation so as to keep pH of the solution at 9 to 13, and whereby nickel oxide precipitates on the support; and stabilizing the catalyst precursor by reducing with hydrogen and passing in either oxygen diluted with nitrogen or an organic material.

2. The process defined in claim 1 wherein said compound with free oxygen is selected from a group of NaOCl, $H_2O_2$, HOCl and $Ca(OCl)_2$.

3. The process defined in claim 2 wherein said basic compound is selected from a group of NaOH, $NH_4OH$, $(NH_4)CO_3$, $Na_2CO_3$ and $NaHCO_3$.

4. The process defined in claim 3 wherein said compound with free oxygen is $H_2O_2$, and said basic compound is $NH_4OH$, thereby the washing of the catalyst precursor is omitted.

5. The process defined in claim 4 wherein said compound with free oxygen is HOCl.

6. The process defined in claim 1 wherein said catalyst precursor is prepared by dropping the mixed solution of a basic compound and a compound with free oxygen in the mixed solution of a support-containing solution and a Ni-extracted solution during agitation.

7. The process defined in claim 1 wherein the step of reducing the catalyst precursor with hydrogen comprises:

removing the hydroxyl group on the catalyst precursor with hydrogen at a temperature of 180° to 220° C.; and reducing the nickel oxide on the catalyst precursor to nickel at a temperature of 350° to 700° C.

8. A process of regenerating Ni catalysts which had been used in a hydrogenation of petroleum resin which comprises:

separating the Ni-extracted solution and support by extracting the used Ni catalysts with an acid;

preparing support-containing solution by burning the separated support in the flow of air or oxygen diluted with nitrogen at a temperature of 300° to 800° C. for 5 to 15 hours and adding deionized water to the support;

preparing a catalyst precursor by dropping the Ni-extracted solution and a mixed solution of a basic compound and a compound with free oxygen into the support-containing solution during agitation so as to keep pH of the solution at 9 to 13, and whereby nickel oxide precipitates on the support; and stabilizing the catalyst precursor by reducing with hydrogen and passing in either oxygen diluted with nitrogen or an organic material.

9. The process defined in claim 8 wherein said compound with free oxygen is selected from a group of NaOCl, $H_2O_2$, HOCl and $Ca(OCl)_2$.

10. The process defined in claim 9 wherein said basic compound is selected from a group of NaOH, $NH_4OH$, $(NH_4)CO_3$, $Na_2CO_3$ and $NaHCO_3$.

11. The process defined in claim 10 wherein said compound with free oxygen is $H_2O_2$, and said basic compound is $NH_4OH$, thereby the washing of the catalyst precursor is omitted.

12. The process defined in claim 11 wherein said compound with free oxygen is HOCl.

13. The process defined in claim 8 wherein said catalyst precursor is prepared by dropping the mixed solution of a basic compound and a compound with free oxygen in the mixed solution of a support-containing solution and a Ni-extracted solution during agitation.

14. The process defined in claim 8 wherein the step of reducing the catalyst precursor with hydrogen comprises:

removing the hydroxyl group on the catalyst precursor by producing water with hydrogen at a temperature of 180° to 220° C.; and reducing the nickel oxide on the catalyst precursor to nickel at a temperature of 350° to 700° C.

15. A process of preparing Ni catalysts, which comprises:

preparing a catalyst precursor by dropping Ni solution in a support-containing solution during agitation at a temperature of 50° to 90° C. and dropping the mixed solution of a basic compound and a compound with free oxygen in the support-containing solution so as to keep pH of the total solution at 9 to 13; and stabilizing the catalyst precursor by reducing with hydrogen and passing in either oxygen diluted with nitrogen or an organic material.

16. The process defined in claim 15 wherein said compound with free oxygen is selected from a group of NaOCl, $H_2O_2$, HOCl and $Ca(OCl)_2$.

17. The process defined in claim 16 wherein said basic compound is selected from a group of NaOH, $NH_4OH$, $(NH_4)CO_3$, $Na_2CO_3$ and $NaHCO_3$.

18. The process defined in claim 17 wherein said compound with free oxygen is $H_2O_2$, and said basic compound is $NH_4OH$, thereby the washing of the catalyst precursor is omitted.

19. The process defined in claim 18 wherein said compound with free oxygen is HOCl.

20. The process defined in claim 15 wherein said catalyst precursor is prepared by dropping the mixed solution of a basic compound and a compound with free oxygen in the mixed solution of a support-containing solution and a Ni-extracted solution during agitation.

21. The process defined in claim 15 wherein the step of reducing the catalyst precursor with hydrogen comprises:

removing the hydroxyl group on the catalyst precursor with hydrogen at a temperature of 180° to 220° C.; and reducing the nickel oxide on the catalyst precursor to nickel at a temperature of 350° to 700° C.

22. The process defined in claim 15 wherein said support is selected from a group of natural kieselguhr, silica, synthetic silica-alumina and alumina.

* * * * *